W. F. WHITNEY.

Assignor of one-half interest to E. STORM.

Vehicle-Spring.

No. 8,517. Reissued Dec. 10, 1878.

Witnesses
John Becker
Geo. Haynes

Inventor
William F. Whitney
by his Attorneys
Brown & Allen

N. PETERS, PHOTO-LITHOGRAPHER, WASHINGTON, D. C.

UNITED STATES PATENT OFFICE.

WILLIAM F. WHITNEY, OF POUGHKEEPSIE, NEW YORK, ASSIGNOR OF ONE-HALF INTEREST TO EDWARD STORM, OF SAME PLACE.

IMPROVEMENT IN VEHICLE-SPRINGS.

Specification forming part of Letters Patent No 177,307, dated May 9, 1876; Reissue No. 8,517, dated December 10, 1878; application filed April 8, 1878.

*To all whom it may concern:*

Be it known that I, WILLIAM F. WHITNEY, of Poughkeepsie, in the county of Dutchess and State of New York, have invented certain Improvements in Springs for Vehicles, of which the following is a description, reference being had to the accompanying drawing, forming part of this specification.

This invention consists in a novel construction of spring and mode of applying the same to side-bar wagons, whereby a torsional action of the metal of the spring is obtained, and the part of the spring which is subject to torsion is also free to bend longitudinally, and, further, in novel means of equalizing the tension of two springs applied to a vehicle.

Figure 1:
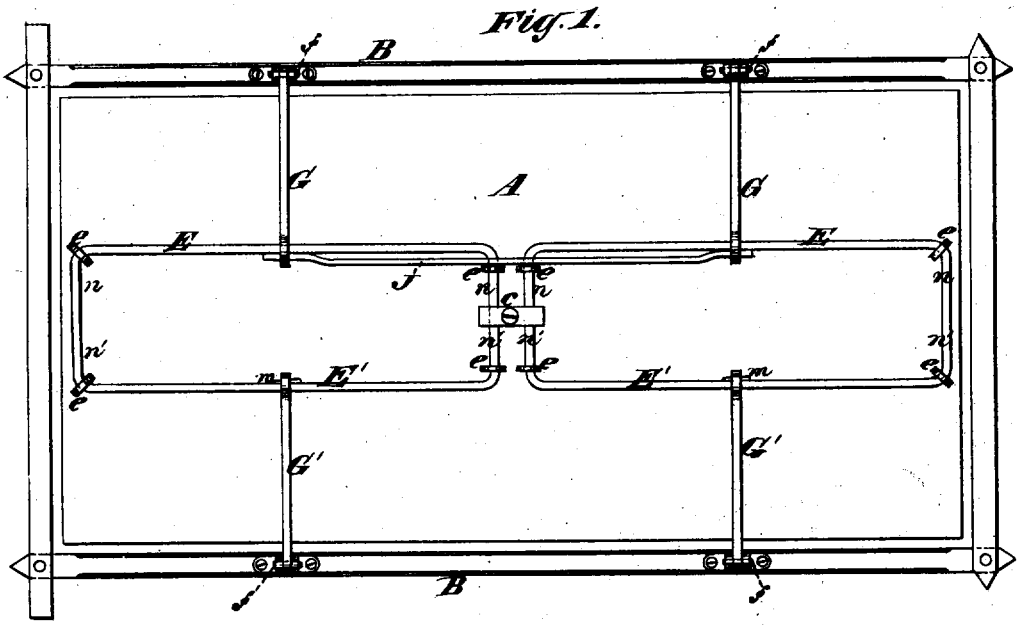
Figure 2:
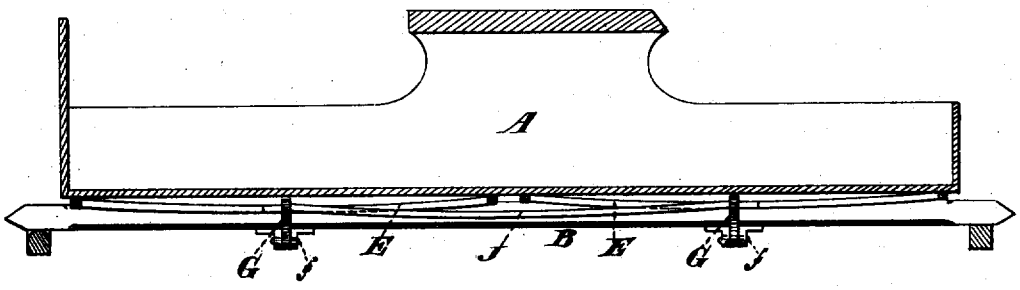
Figure 3:
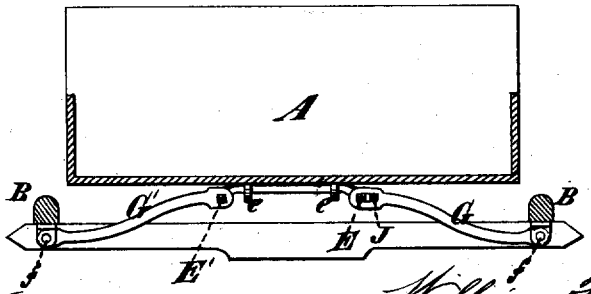

Figure 1 in the drawing is a view of the under side of a wagon provided with four torsion-springs, and with an equalizing bar or spring applied in connection with two of the first-named springs. Fig. 2 is a longitudinal vertical section, and Fig. 3 is a transverse section.

Each of the four torsion-springs above mentioned consists of a torsion rod or bar, E or E′, bent at each end to form a crank, *n* or *n′*, to provide for its rigid attachment to the vehicle, and furnished with an arm, G or G′, at a distance from each end, to serve as a lever by which to effect the torsional action of the said rod or bar E or E′, which produces the elasticity of the spring.

In the example of my invention represented two of the twisting or torsion rods or bars E E′ are formed of a continuous piece bent into the form of a rectangular frame, as shown in Fig. 1, two of the parallel sides of such frame constituting the said torsion rods or bars, and the other two sides of the same constituting the cranked ends *n n n′ n′* of the said torsion rods or bars. This construction of the torsion rods or bars E E′ in pairs, each being provided or supplied with crank-arms *n n n′ n′*, is such that the cranked portions *n n* form the medium of rigidly attaching one of said rods or bars to the vehicle, and the crank portions *n′ n′* are intended to form the medium of rigidly attaching the other of said rods or bars to the vehicle. The attachment of the lever-arm G or G′ to its twisting or torsion bar E or E′ must be rigid.

The arm is shown as made of a separate piece from the rod, and provided with an eye, through which the rod is inserted, and in which the rod is secured by a key, *m*, passing through the said eye and bearing against the said rod. The said arm is shown as projecting from its rod or bar E or E′ in an opposite direction to that in which its arms *n n* or *n′ n′* project from it.

The springs E G and E′ G′ are shown as having their cranks *n n* and *n′ n′* rigidly secured to the bottom of the body A of the wagon, and having the extremities of their lever-arms G G′ each constructed with an eye, the axis of which is parallel, or thereabout, with the torsional axis of the spring, for the reception of a pin, *f*, by which a pivotal connection is made between the spring and the side bar.

The rigid attachment of the cranks *n n* and *n′ n′* to the wagon-body is shown as made by staples *e e* and cleats *c*, which clamp the said cranks firmly to the body, the length of the said cranks being sufficient to form a firm bearing and prevent the loosening of the connection by the twisting action of the rods or bars E E′. In order to provide for their free torsional action, the torsion rods or bars E E′ are made of arched form longitudinally, the curvature being shown in Fig. 2 in a downward direction from the cranks. This curvature not only keeps the said rods or bars clear of the wagon-body, but provides compensation for the natural tendency of the springs to slightly shorten themselves as they are twisted, such compensation being effected by their slightly straightening themselves or reducing their curvature in the act of twisting.

It will be observed that the springs have no other connection with the body and side bar of the wagon except those made by the cranks *n n′* and the extremities of the arms G G′, the guide-bearings which have been commonly used in connection with the torsion rods or bars of other torsion-springs, and which tend to prevent the flexure of the said rods or bars, being dispensed with, and the said rods or bars being free to bend upward and downward, to some extent, under the weight of the wagon-body, whereby an additional resiliency of the spring beyond what results merely from torsion is obtained.

The torsion-rods E E′ of the two springs E

G E′ G′ on one side of the wagon are represented as being connected by an equalizing-bar, J, forming an auxiliary torsion-spring. This equalizing bar or spring J consists of a steel rod having its ends squared and fitted into the eyes of the lever-arms G, and having its intermediate portion bent or offset sufficiently to allow it to twist. By means of this equalizing-bar the torsion is transferred from one rod, E or E′, to the other, and the difference in their torsion, if any there be, is compensated for when the load is not evenly distributed. This equalizing-bar may also be used, in some cases, when the spring extends the entire length of the vehicle and is fastened midway of its length.

What I claim, and desire to secure by Letters Patent, is—

1. A torsion-spring consisting of a rod of arched form longitudinally, with an arm at a distance from either end, substantially as herein described.

2. A torsion-spring consisting of a rod of arched form longitudinally, with an arm at a distance from either end, and having in said arm an eye, the axis of which is parallel, or thereabout, with the torsional axis of the spring, substantially as herein described.

3. The combination, with the body and side bar of a side-bar wagon, of a torsional spring consisting of an arched rod or bar having an arm at a distance from either end, the ends of the said rod or bar and the extremity of the said arm being connected, respectively, with the body and the side-bar, substantially as herein described.

4. The combination, with the body and one of the side bars of a side-bar wagon, of a spring consisting of a rod or bar having an arm which is distant from both its ends, the said rod or bar being connected at its ends with the wagon-body, and the said arm being connected with the side bar, the construction and arrangement being such that the said rod or bar will be subjected to torsion, and at the same time free to bend upward and downward under the weight of the wagon-body, substantially as herein set forth.

5. The auxiliary spring or equalizing-bar J, in combination with two torsion-springs, substantially as and for the purpose herein described.

WILLIAM F. WHITNEY.

Witnesses:
E. H. FORDHAM,
H. A. HORSFALL.